No. 837,742.　　　　　　　　　　　　　　　PATENTED DEC. 4, 1906.
H. B. SINCLAIR.
POULTRY FOUNT.
APPLICATION FILED FEB. 12, 1906.
2 SHEETS—SHEET 1.
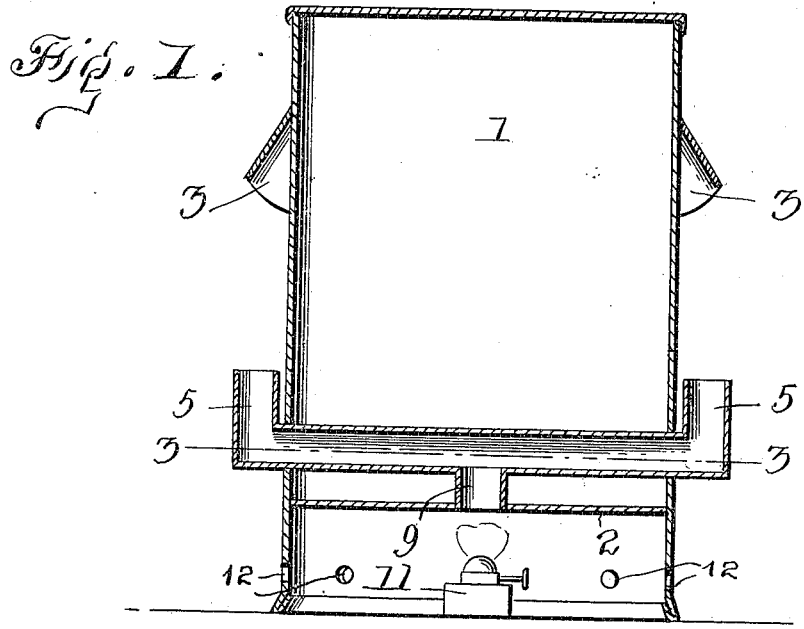
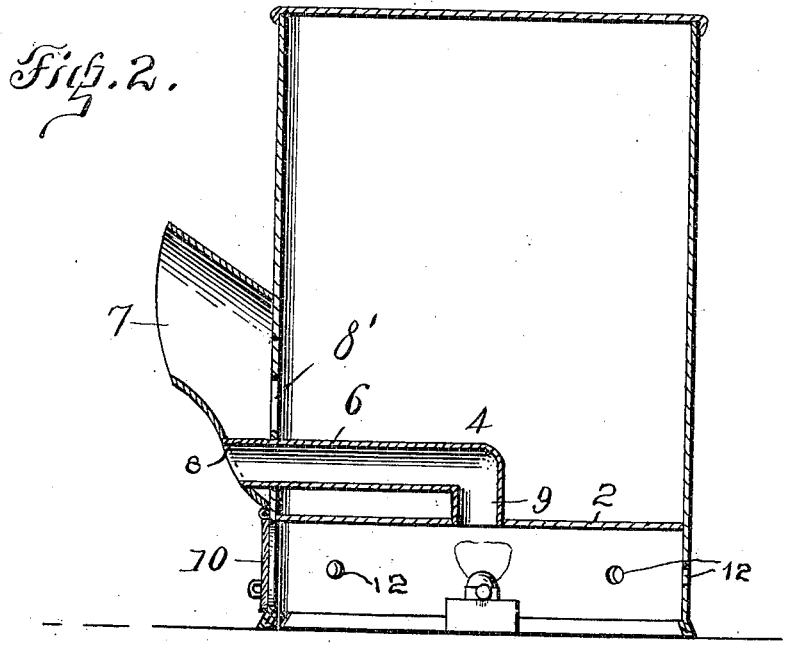
Witnesses　　　　　　　　　　　　　　　Inventor
　　　　　　　　　　　　　　　　　　　　H. B. Sinclair,
　　　　　　　　　　　　　　　　　　　by
　　　　　　　　　　　　　　　　　　　　　Attorneys No. 837,742.

PATENTED DEC. 4, 1906.

H. B. SINCLAIR.
POULTRY FOUNT.
APPLICATION FILED FEB. 12, 1906.

2 SHEETS—SHEET 2.

Witnesses
Jas. A. Koehl.
P. H. Griesbauer.

Inventor
H. B. Sinclair.
by H. B. Willson & Co.
Attorneys

UNITED STATES PATENT OFFICE.

HERBERT B. SINCLAIR, OF HOMER, MICHIGAN.

POULTRY-FOUNT.

No. 837,742.　　　　Specification of Letters Patent.　　　　Patented Dec. 4, 1906.

Application filed February 12, 1906. Serial No. 300,649.

*To all whom it may concern:*

Be it known that I, HERBERT B. SINCLAIR, a citizen of the United States, residing at Homer, in the county of Calhoun and State of Michigan, have invented certain new and useful Improvements in Poultry-Founts; and I do declare the following to be a full, clear, and exact description of the invention, such as will enable others skilled in the art to which it appertains to make and use the same.

This invention relates to poultry-founts; and one of the principal objects of the same is to provide a simple and efficient means for preventing the water in the fount from freezing during cold weather.

Another object is to provide a drinking-fount for poultry of simple construction which will gradually feed a small quantity of water to a trough or spout and to provide means for preventing the water from freezing in the lower part of the fount and to give to the water in the trough the required temperature for use in cold weather.

These and other objects are attained by means of the construction illustrated in the accompanying drawings, in which—

Figure 4:
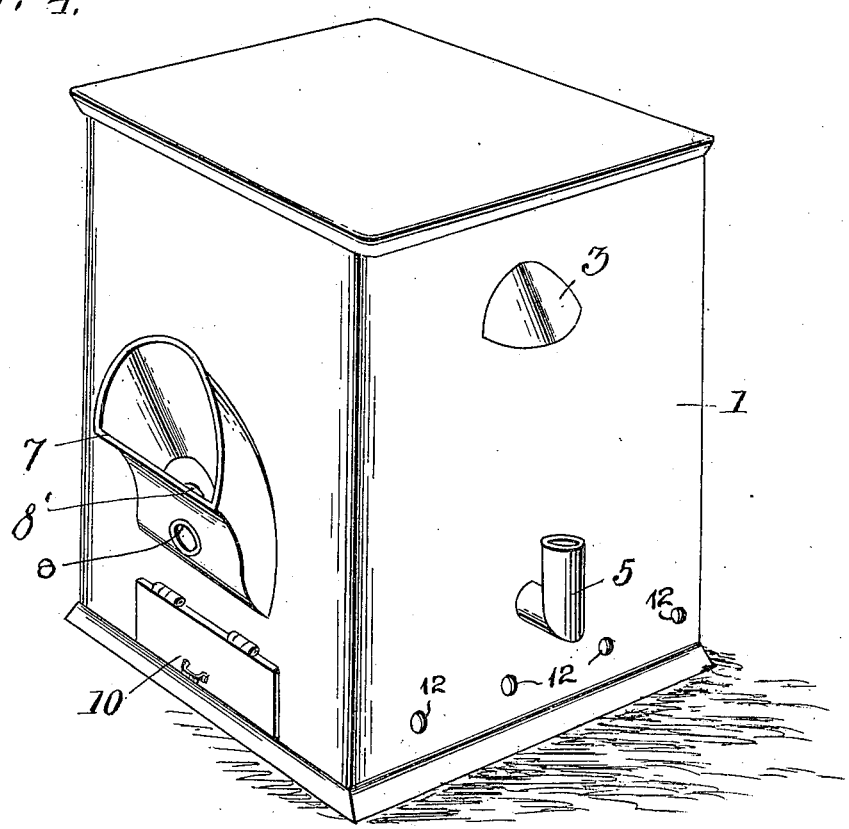
Figure 3:
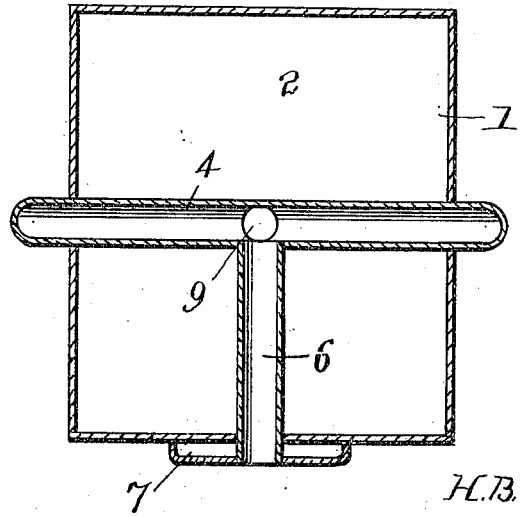

Figure 1 is a vertical sectional view of my fount. Fig. 2 is a similar view taken at right angles to Fig. 1. Fig. 3 is a horizontal sectional view on the line 3 3, Fig. 1; and Fig. 4 is a perspective view of the fount.

Referring to the drawings for a more particular description of my invention, the numeral 1 designates a casing or tank for containing water, said tank, as shown, being substantially rectangular in cross-section and provided with a bottom 2, secured within the tank at some distance above the lower edge of the side walls of the same. Handholds 3 are secured at the sides of the tank. Within the tank at a point near the bottom thereof a pipe 4 extends transversely across the fount, the ends of said pipe extending through the side walls and provided with upwardly-extending terminal ends 5, disposed outside the side walls of the tank and contiguous thereto. A pipe 6 is connected centrally to the pipe 4 and extends forwardly and out through the front wall of the tank and through the front wall of a trough 7, a short section 8 of said pipe extending through the trough for a purpose which will presently appear. An opening 8' is formed in the front wall of the tank to permit the water to flow into the trough. A short section of pipe 9 extends through the bottom and communicates with the pipe 4. A door 10 is hinged to the front wall of the fount at the bottom thereof, and a suitable lamp or other heater 11 is placed underneath the tank to prevent water from freezing therein. The side walls of the tank, below the bottom, are provided with air-holes 12 to feed air to the heating device.

The operation of my invention may be described as follows: To fill the tank, the same is laid upon its side with the trough uppermost, and water is poured in until the tank is full or nearly so, when it is placed in an upright position, the water in the tank then feeding down to the trough gradually. In cold weather the heater is placed in position under the bottom of the tank and the heat adjusted to prevent the water from freezing in the lower part of the tank, the heat passing up through the short section of pipe and laterally out through the pipe 4 and upwardly through the terminal ends 5. The short section of pipe within the trough prevents the freezing of the water after it has been fed into said trough.

From the foregoing it will be obvious that my invention is of a simple and inexpensive character and can be used in all kinds of weather, and the water can be kept from freezing in the coldest climates, and poultry can be given water at any required temperature.

Various changes in the form, proportion, and the minor details of construction may be resorted to without departing from the principle or sacrificing any of the advantages of this invention as defined by the appended claim.

Having thus described my invention, what I claim as new, and desire to secure by Letters Patent, is—

In a poultry-fount, a tank provided with a trough at the front side thereof, a bottom disposed within the walls thereof, a flue-pipe extending horizontally through the tank and having its terminal ends outside the walls thereof, an outlet-pipe connected to said flue-pipe and extending out through the trough, at right angles to said flue-pipe, a vertical section of pipe extending through the bottom of the tank and communicating with said pipes, in combination with a heating device under the bottom of the tank, and in line with said vertical section of pipe.

In testimony whereof I have hereunto set my hand in presence of two subscribing witnesses.

HERBERT B. SINCLAIR.

Witnesses:
   E. F. SINCLAIR,
   E. J. FELLOWS.